Figure 1:
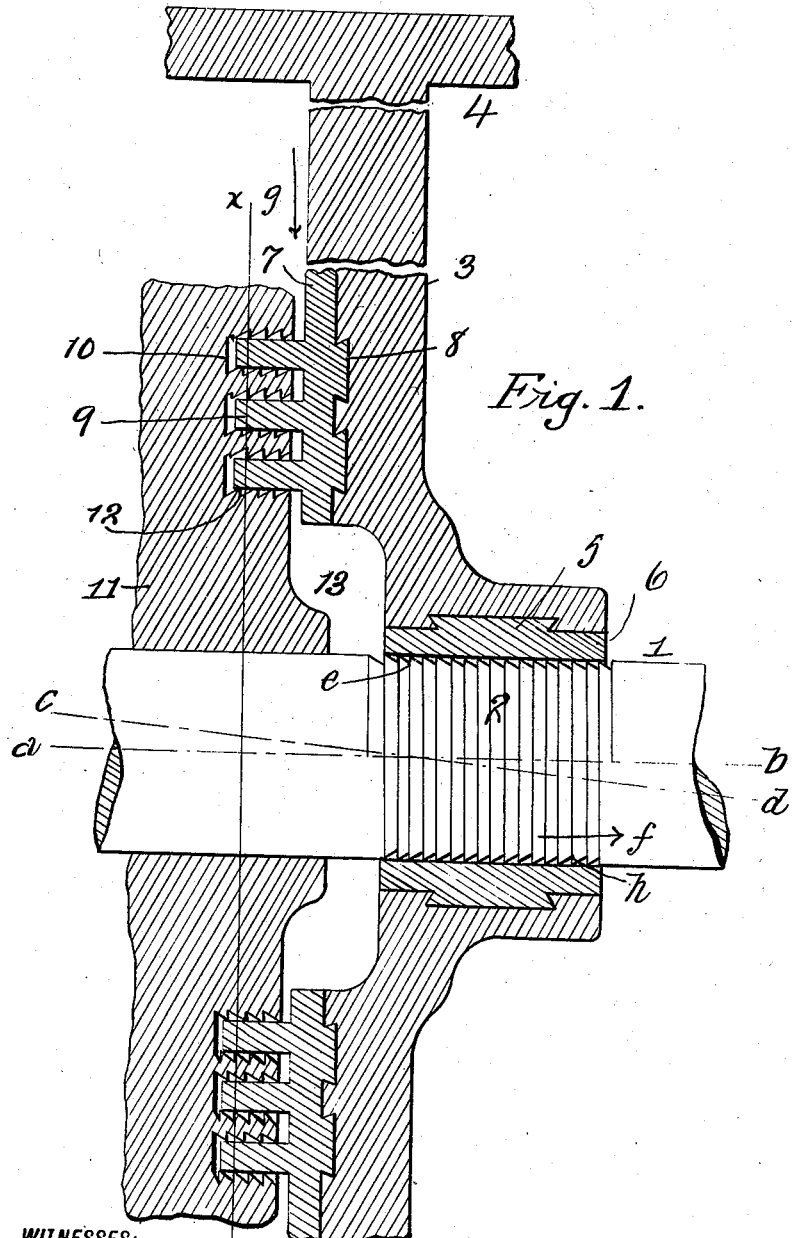

No. 858,859. PATENTED JULY 2, 1907.
G. DALÉN.
JOINT TIGHTENING DEVICE.
APPLICATION FILED AUG. 3, 1906.

2 SHEETS—SHEET 1.

WITNESSES:

INVENTOR
Gustaf Dalén
BY
ATTORNEY

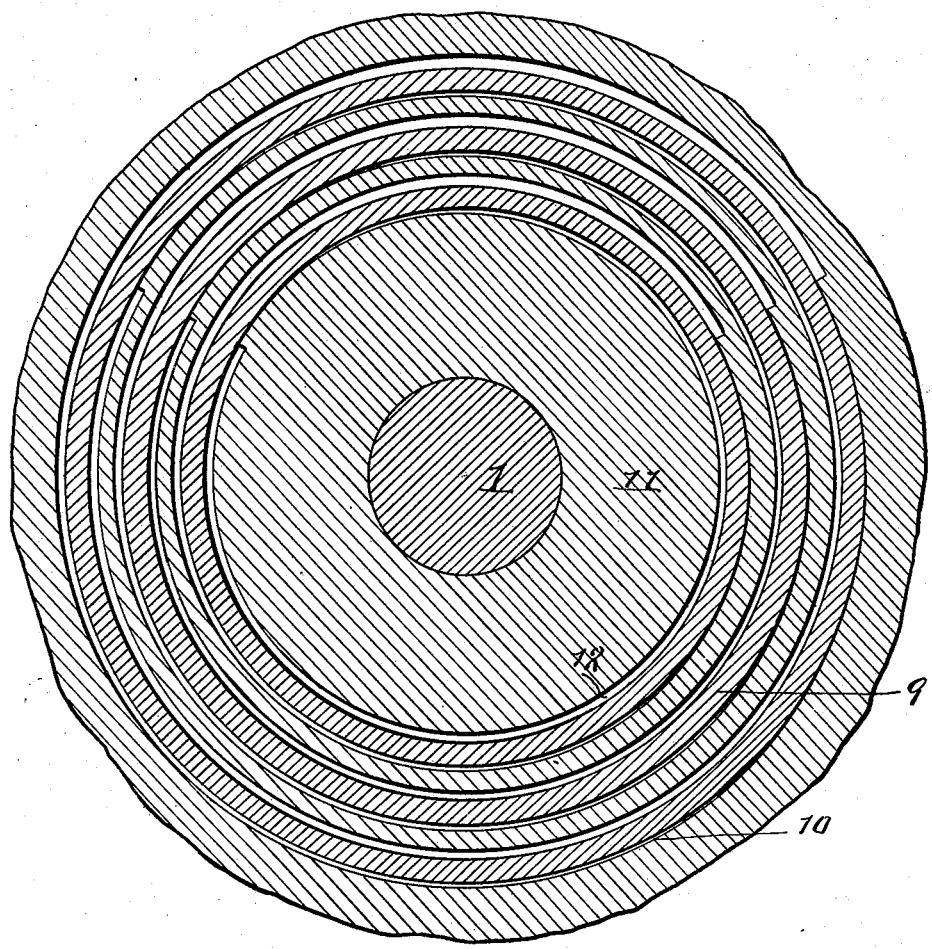

UNITED STATES PATENT OFFICE.

GUSTAF DALÉN, OF STOCKHOLM, SWEDEN.

JOINT-TIGHTENING DEVICE.

No. 858,859.      Specification of Letters Patent.      Patented July 2, 1907.

Application filed August 3, 1906. Serial No. 329,040.

*To all whom it may concern:*

Be it known that I, GUSTAF DALÉN, a subject of the King of Sweden, residing at Fredsgatan 15, Stockholm, Sweden, have invented a certain new and useful Improvement in Joint-Tightening Devices, of which the following is a specification.

The invention relates to means for forming the joint between a rotating member, as for example a shaft, and its bearing, and is designed to overcome certain difficulties of the so-called labyrinth packing. Such packing is produced by forming upon the shaft a number of circumferential grooves or channels which receive fluid from the chamber into which the shaft enters. The fluid in the successive grooves becomes reduced in pressure to substantially that of the outside atmosphere and thus the leakage outward is prevented or reduced to an inconsiderable minimum. This packing may operate efficiently so long as the parts maintain their normal relative position, but when through settling or wear this relative position is changed, so that the axis of the shaft is no longer coincident with or parallel to the axis of the bearing certain of the ribs between the grooves make closer contact than others with the bearing surface and undue friction with cutting results. Instead of circumferential grooves upon the shaft, I form thereon a screw thread, having a cutting edge. Hence, when the shaft becomes displaced with reference to the bearing, or vice versa, as above described, the thread acts directly upon the bearing lining, which is made of metal softer than the metal of the thread, to cut away said lining smoothly and without rifling and thus to form a joint which will continue substantially tight. The direction of rotation of the shaft is to be such that the effect of the thread upon the fluid entering the channel between its turns will be to force the fluid in a direction opposite to that of its leakage through the joint, or in other words back into the chamber containing the fluid under pressure.

In the accompanying drawings Figure 1 is a vertical section showing the shaft and so much of the wheel body and of a fixed partition in an elastic fluid turbine as is necessary to illustrate the operation of my device applied thereto. Fig. 2 is a section on line *xx* of Fig. 1.

Similar numbers of reference indicate like parts.

1 is the wheel shaft on the surface of which is cut a sharp edged screw thread 2.

3 is a partition integral with or supported upon the turbine casing 4. In said partition, is an opening having a circumferential dovetail groove which receives the similarly shaped projection 5 on the circumference of lining ring 6. The ring 6 is to be made of metal softer than that of the shaft 1 and incloses the threaded portion 2 of said shaft.

If it be assumed, for illustration, that the relative position of the shaft 1 and the ring 6 changes so that the shaft axis moves from the position *a*, *b*, to *c*, *b*, then the thread 2 approximately at *e* and *h* will cut the ring 6, as above described, and form a smooth joint between shaft and ring conformable to the new position of said shaft.

As a modification of this device I may employ a ring 7 of soft metal secured by a dovetail projection 8 upon one face of the fixed partition 3 and provided with ribs and grooves 9 interengaging grooves and ribs 10 in the wheel body 11 fast on shaft 1. In this case the faces on the wheel body 11 are threaded as shown at 12, so that said rotary threaded portion will act to cut the stationary ring 7 when the relative position of the parts change substantially, as before described.

In the case of a pump the flow of liquid, or in that of a steam turbine the flow of steam is normally from the casing chamber 13 in the direction of the arrow *f*. The shaft 1 is, therefore, rotated in such direction, or if the direction of rotation of the shaft is predetermined, the direction of the turns of the screw thread is to be in such direction as to force the liquid or gas in a direction opposite to that of the arrow *f*. So also in the case of the threads 12, the normal direction of steam or liquid flow being as indicated by the arrow *g*, from wheel circumference to shaft, the effect of the rotating threads 12 is to be to force the said flow in the opposite direction.

The two modifications described when used conjointly serve to secure a close joint between partition and shaft as well as between wheel and partition, and, therefore, are especially applicable to a turbine wheel or rotary pump. I may employ the invention, however, in connection with any rotary shaft and its bearing, or with any rotary body and fixed body between which there is a joint to be kept tight from leakage of liquid or gas.

I claim:—

1. In a mechanism a moving member and a fixed member of softer material receiving said moving member, the said moving member being constructed to cut said fixed member and thereby to form a close joint at their contact surfaces.

2. In a mechanism, a rotary shaft having a cutting thread on its periphery and a fixed bearing for said shaft of material capable of being cut by said thread.

3. In a mechanism, a rotary shaft, a fixed bearing therefor, and in said bearing a lining of material softer than said shaft: the said shaft being constructed to cut said lining and thereby to form a close joint therewith.

4. In a mechanism, a rotary shaft, having on its periphery a cutting thread and a fixed bearing inclosing and formed of material softer than said cutting thread.

5. A rotary disk, a fixed partition parallel thereto there being interengaging ribs and grooves on the opposing faces of said disk and partition : the engaging groove or rib surfaces on said disk being constructed to cut the engaging rib or groove surfaces on said partition.

6. A rotary disk, having a concentric annular internally threaded face groove and a fixed partition parallel to said disk and provided with an annular projection received in said groove.

7. A rotary disk, having a concentric annular internally threaded face groove, a fixed partition parallel to said disk there being on the proximate face of said partition a rib of material softer than the material of said disk and received in said groove.

8. A rotary disk, having a plurality of concentric annular internally threaded face grooves, a fixed partition parallel to said disk there being on the proximate face of said partition a plurality of concentric ribs of material softer than the material of said disk and received in said grooves.

9. A rotary disk, having a concentric annular externally threaded face rib and a fixed partition parallel to said disk having an annular groove receiving said rib.

10. In an elastic fluid turbine, a shaft, having a portion of the periphery threaded, a fixed partition receiving said threaded portion, a wheel carried by said shaft, there being on the contiguous faces of said wheel and said partition interengaging annular ribs and grooves, the contact surfaces of said ribs or grooves on said wheel being threaded, and adapted to cut the contact surfaces of said grooves or ribs on said partition.

11. In combination with a chamber containing fluid under pressure, a shaft entering said chamber and a bearing for said shaft in the wall thereof, there being a cutting screw thread on said shaft; the said screw thread being constructed to force liquid entering from said chamber to the joint between said shaft and bearing backward into said chamber and the said bearing being of material capable of being cut by said cutting thread.

12. In combination with a chamber containing fluid under pressure, a shaft entering said chamber, a bearing for said shaft in the wall thereof, there being a cutting screw thread on said shaft inclosed in said bearing; the said bearing being of material capable of being cut by said cutting thread.

In testimony whereof I have affixed my signature in presence of two witnesses.

GUSTAF DALÉN.

Witnesses:
WALDEMAR BOMAN,
T. EKEBOHM.